United States Patent
Xu et al.

(10) Patent No.: US 12,148,193 B1
(45) Date of Patent: Nov. 19, 2024

(54) METHOD FOR IDENTIFYING COLLISION REGIONS OF BOUNDARY LAYER CONVERGENCE LINES PRONE TO TRIGGER LOCAL CONVECTION

(71) Applicant: Nanjing Joint Institute for Atmospheric Sciences, Nanjing (CN)

(72) Inventors: Fen Xu, Nanjing (CN); Yu Zheng, Nanjing (CN); Yaqiang Wang, Nanjing (CN)

(73) Assignee: Nanjing Joint Institute for Atmospheric Sciences, Nanjing (CN)

( * ) Notice: Subject to any disclaimer, the term of this patent is extended or adjusted under 35 U.S.C. 154(b) by 0 days.

(21) Appl. No.: 18/668,179

(22) Filed: May 19, 2024

(30) Foreign Application Priority Data

Dec. 5, 2023 (CN) .......................... 202311654614.7

(51) Int. Cl.
| | |
|---|---|
| *G06K 9/00* | (2022.01) |
| *G01S 13/89* | (2006.01) |
| *G06V 10/25* | (2022.01) |
| *G06V 10/762* | (2022.01) |
| *G06V 20/70* | (2022.01) |
| *H04N 1/60* | (2006.01) |

(52) U.S. Cl.
CPC ............. *G06V 10/25* (2022.01); *G01S 13/89* (2013.01); *G06V 10/762* (2022.01); *G06V 20/70* (2022.01); *H04N 1/60* (2013.01)

(58) Field of Classification Search
None
See application file for complete search history.

(56) References Cited

U.S. PATENT DOCUMENTS 11,555,921 B2 * 1/2023 Xiao ....................... G01W 1/10

FOREIGN PATENT DOCUMENTS

| CN | 102609725 A | 7/2012 |
|---|---|---|
| CN | 112946655 A | 6/2021 |
| CN | 113673181 A | 11/2021 |

OTHER PUBLICATIONS

Pang et al., "R2-CNN: fast tiny object detection in large-scale remote sensing images", 2019.*
Li et al., "Sketch-R2CNN: an attentive network for vector sketch recognition", 2018.*

(Continued)

*Primary Examiner* — S J Park
(74) *Attorney, Agent, or Firm* — Nitin Kaushik

(57) ABSTRACT

The present invention discloses a method for identifying collision regions of boundary layer convergence lines prone to trigger local convection, including the following steps: S1: collecting and pre-processing data; S2: manually labeling and screening an image data set, and designing a multi-scale anchor box according to a label set by using a clustering analysis method; S3: constructing an R2CNN deep learning module, setting reasonable anchor window parameters, and training the model; S4: detecting an image by using the trained model to obtain detection results of rotating bounding boxes, and scoring the detection results; correcting and fusing the detection results of the overlapped bounding boxes to obtain an identification result of the plurality of boundary layer convergence lines; and S5: positioning and identifying regions prone to trigger the local convection.

7 Claims, 6 Drawing Sheets

(56) References Cited

OTHER PUBLICATIONS

Jiang et al., "R2CNN: rotational region CNN for orientation robust scene text detection", 2017.*

Han et al., Convolutional neural network for convective storm nowcasting using 3-D Doppler weather radar data, (Year: 2020).*

* cited by examiner

METHOD FOR IDENTIFYING COLLISION REGIONS OF BOUNDARY LAYER CONVERGENCE LINES PRONE TO TRIGGER LOCAL CONVECTION

CROSS-REFERENCE TO RELATED APPLICATIONS

The application claims priority to Chinese patent application No. 2023116546147, filed on Dec. 5, 2023, the entire contents of which are incorporated herein by reference.

TECHNICAL FIELD

The present invention belongs to the field of meteorological data processing, and relates to identification of regions prone to trigger local convection, in particular to a method for identifying collision regions of boundary layer convergence lines prone to trigger local convection.

BACKGROUND

A boundary layer convergence line is one of important mesoscale synoptic systems that trigger convection, and its passage has obvious features of wind direction and wind speed changes, accompanied by low-level convergence and uplift. Therefore, its existence often corresponds to obvious local uplift movement, and causes the water vapor near the surface layer to be fully mixed, providing a trigger mechanism or favorable conditions for the formation and development of severe convection.

Generally, the collision or intersection of two or more boundary layer convergence lines can cause the formation of convective initiation, convective storm/cloud cluster merging and atmospheric tidal bore with high probability. When two boundary layer convergence lines intersect, thunderstorms are more likely to occur near an intersection region. For example, when gust front moves across the cloudstreets composed of horizontal convective rolls, the cumulus cloud on the cloudstreets will become the thunderstorms in most cases. Some scholars have found that the probability of triggering convection is the highest when the angle between two boundary layer convergence lines during collision is less than 80°. The boundary layer convergence lines are represented as a narrow-band echo on a weather radar image. For example, the gust front and sea breeze front are represented as an arc-shaped narrow band with a vertical height below 3 km, echo intensity ranging from 0 to 35 dBZ and a narrow-band width ranging from 2 km to 13 km on different weather radar reflectivity images. The corresponding position in the radial velocity images is a convergence region or a narrow band, when the radial velocity data in a good quality.

Efficient identification and location of boundary layer convergence lines greatly enhance monitoring and early warning capabilities for windstorm disasters induced by such convergence lines (e.g., the gust front), or the detection of easily triggered convective regions, thereby advancing convection early warning systems. Thus, accurate identification of boundary layer convergence lines is of paramount importance and urgency.

At present, research on the identification and application of BLCL primarily focuses on the gust fronts. Existing technologies for identifying gust fronts rely heavily on statistical fuzzy logic algorithms, mathematical morphology methods based on image morphology, neural network identification algorithms, and similar approaches. However, these methods often lack universality and robustness. For instance, a specific algorithm may only be able to identify a particular type of gust front of a specific size and intensity as observed by a certain type of weather radar in a specific region. Therefore, there is an urgent need to develop an identification technology for boundary layer convergence lines that is accurate, possesses strong generalization capabilities, and can effectively locate and identify regions prone to triggering local convection by considering the interactions of boundary layer convergence lines.

SUMMARY

Objective: in view of the limitations in the prior art, an objective of the present invention is to provide a method for identifying collision regions of boundary layer convergence lines prone to trigger local convection.

Technical solution: the method proposed by the present invention for identifying collision regions of boundary layer convergence lines prone to trigger local convection includes the following steps:

S1: processing radar raw data containing features of the boundary layer convergence lines to obtain normalized grid point radar echo data, and processing the obtained data into a color image file suitable for experts to manually label through color conversion;

S2: manually labeling and screening an image data set, designing a rotational box with five properties of center coordinate, width, height and angle of inclination as a data label, mapping the data label to the corresponding normalized grid point radar echo data to generate a boundary layer convergence line identification data set, and designing a multi-scale anchor box combination according to the data set by using a cluster analysis method;

S3: constructing an R2CNN model, and designing model parameters according to image features of the boundary layer convergence lines to perform model training;

S4: detecting an image by using the trained model to obtain detection results of rotating bounding boxes, calculating a confidence score of the detection result of each rotating bounding box, and deleting a predicted bounding box with a confidence less than a threshold; calculating an overlapping extent of bounding boxes when the bounding boxes are overlapped; determining the two rotating bounding boxes with the overlapping extent meeting the requirements as the detection result of the same boundary layer convergence line; suppressing the other rotating bounding boxes to obtain the rotating bounding boxes with high confidence scores as a final target detection result; S5: identifying the boundary layer convergence lines that intersect each other, and calculating an intersection angle and a movement direction of triggered convection according to the prior knowledge of a triggered convection mechanism, so as to locate and identify the regions that are prone to trigger the convection.

A further preferred technical solution of the present invention is that the processing radar raw data containing features of the boundary layer convergence lines in step S1 includes:

collecting radar raw data within continuous time, extracting radar reflectivity data of two lowest elevation angle layers from the data, and adaptively processing the extracted data into uniform grid data of n×n km2 according to a spatial resolution n of processed radar data; and performing normalization processing on maximum and minimum values of the grid radar echo data until the values are within a numerical range of 0 to 1, so as to generate grid point radar echo data.

Preferably, the processing radar raw data containing features of the boundary layer convergence lines in step S1 further includes: performing color conversion on the radar raw data to generate an RGB color image for meteorological experts to label.

Preferably, in step S2, the labeling of the features of the boundary layer convergence lines is performed on the RGB color image generated in S1 by the meteorological experts; during labeling, the rotating box with five properties of center coordinate, width, height and the angle of inclination is designed as the data label, where the inclination direction of an inclination box keeps perpendicular to the movement direction of the boundary layer convergence lines and the length and width of the inclination box need to cover an affect region of the convergence lines.

Preferably, cross labeling is performed by at least 2 to 3 experts, and samples with great labeling difference are eliminated through comparison.

Preferably, in step S2, based on a screened label set, aspect ratios and areas of all the bounding boxes in the label set are counted to describe information of scales of the boundary layer convergence lines, and an anchor window combination which can describe the image features of the boundary layer convergence lines of different scales observed by weather radars of different types and different bands is designed by using K-Means clustering analysis method in combination with prior knowledge.

Preferably, in the R2CNN model constructed in step S3, predefined rotating anchor windows of a rotating region proposal network are configured as anchor windows with ratios of 0.125, 0.25, 0.5, 1, 2, 4 and 8, which are used for defining the aspect ratio of each anchor point.

Preferably, in step S4, predicted results of the rotating bounding boxes outputted by the R2CNN model are preliminarily screened, and a predicted confidence threshold is set to 0.5, and the predicted bounding box with confidence lower than the threshold is deleted. At the same time, according to the image features of the boundary layer convergence lines, the bounding box with the inclination angle parallel to a connecting line direction from its center coordinate to a radar station is deleted, and the inclination angle is an included angle between the short side of the bounding box and the perpendicular direction.

Preferably, in step S4, the overlapping extent is calculated by using intersection over union (IoU) for the detection results of the rotating bounding boxes which are overlapped during the detection of the same image. When the IoU is greater than or equal to 0.5, it is considered that regions detected by the two or more bounding boxes belong to the same boundary layer convergence line, and the other rotating bounding boxes are suppressed to obtain the rotating bounding box with a high confidence score as the final target detection result;

the overlapping extent is calculated by using the intersection over union (IoU) for the detection results of all the rotating bounding boxes in two images with different elevation angles at the same time. When the IoU is greater than or equal to 0.5, it is considered that regions detected by the two or more bounding boxes belong to the same boundary layer convergence line, and the other rotating bounding boxes are suppressed to obtain the rotating bounding box with a high confidence score as the final target detection result.

Preferably, in step S5, when there are overlapped rotating bounding boxes, but the IoU is less than 0.3, it is considered that the two detected rotating bounding boxes are collision-type boundary layer convergence lines; an included angle between the two intersected bounding boxes is calculated; when the included angle is in a range of 30° to 90°, it is considered that an overlapped region is a region prone to trigger the local convection; an intersection region of the two bounding boxes is extracted as an identification result of a final region prone to trigger the local convection;

when the included angle is in a range of 0° to 30°, whether the movement directions of the two bounding boxes are opposite is judged; and if so, central regions of the two bounding boxes are determined as final regions prone to trigger the local convection.

Beneficial effects: a rotating boundary box without fixed value is designed in the present invention when the boundary layer convergence lines are manually labeled, extremely reducing the labeling workload of the experts. The present invention makes full use of the detection results of the rotating bounding boxes of R2CNN model to represent various key feature parameters of the boundary layer convergence lines, including the length, width, central position and inclination angle of the boundary layer convergence lines in the radar image. Where, the length and width describe the size of the boundary layer convergence line region, the central position describes the position of the boundary layer convergence line in the radar image, and the inclination angle describes the direction of the boundary layer convergence line. The present invention can accurately and effectively implement identification and detection work for an image containing a plurality of boundary layer convergence lines. This is an important foundation for the identification of local convection trigger regions and also a key step for an early-warning of gale region. For example, the movement direction of the boundary layer convergence line can be calculated according to the inclination angle. In particular, because the inclination direction of the bounding box of the boundary layer convergence line is perpendicular to the movement direction of the boundary layer convergence line, the movement direction of the boundary layer convergence line can be calculated by the inclination angle. This movement direction information is not only conducive to identify two boundary layer convergence lines moving in opposite directions, but also has important indicative significance for the early warning of gale regions subsequently caused by gust front which is one of the boundary layer convergence lines. The present invention plays an important role in automatic detection of local convection regions triggered by the collision of the boundary layer convergence lines, and has a good application prospect.

DETAILED DESCRIPTION OF THE EMBODIMENTS

Figure 1:
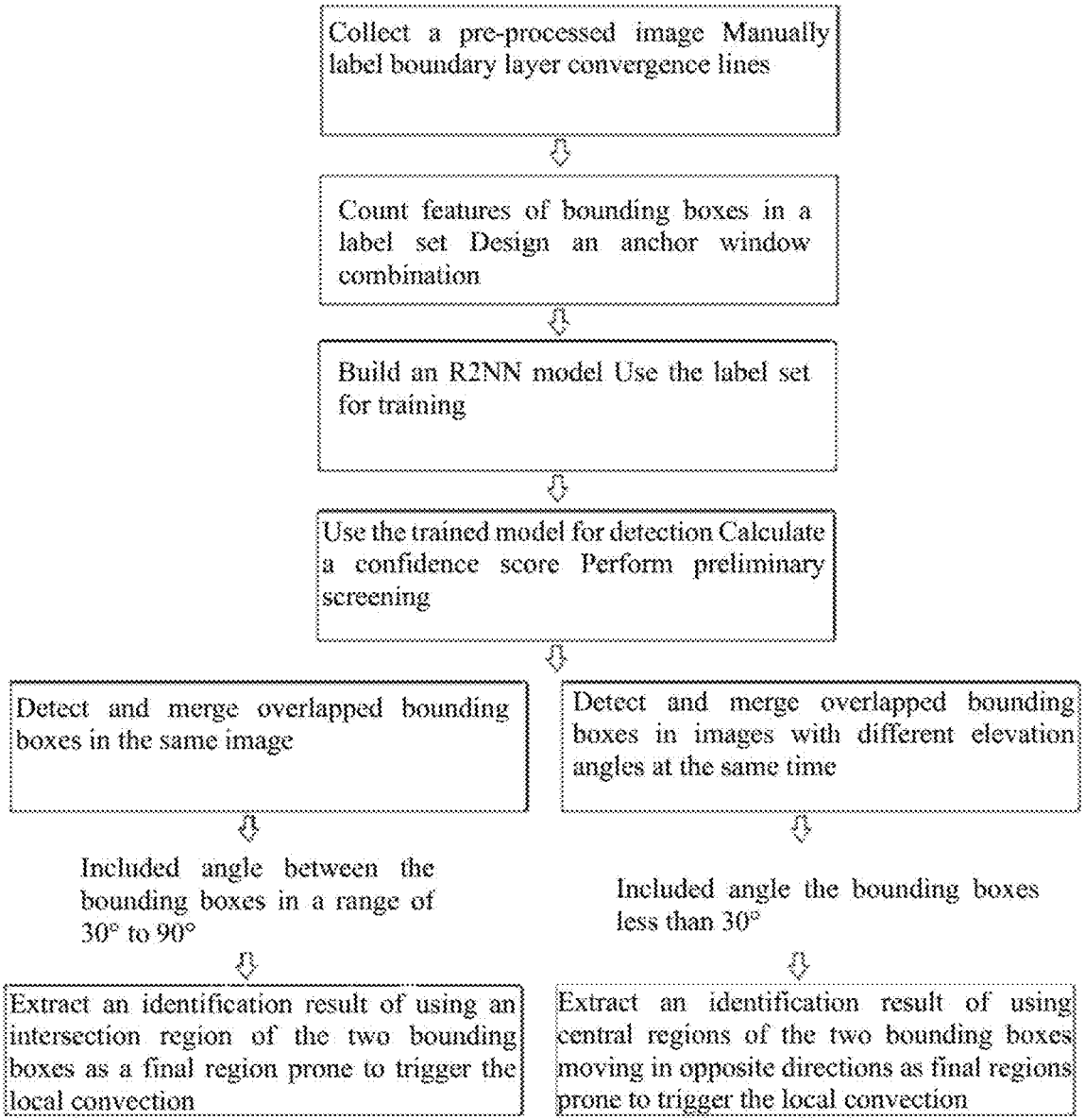
FIG. 1 is a flowchart of the present invention.

The technical solutions of the present invention will be described in detail below, but the protection scope of the present invention is not limited to the examples.

Embodiments: a method for identifying collision regions of boundary layer convergence lines prone to trigger local convection, including the following steps:

S1: a data set used in this embodiment is all radar raw data containing continuous occurrence and development periods of boundary layer convergence lines observed by weather radars of various types and different bands in China. Radar reflectivity data of the lowest two elevation angle layers is extracted; according to a spatial resolution n of the processed radar data, the extracted data is adaptively processed into uniform grid data of n×n km2, where n is determined by a maximum observation radius R of the radar and a radial resolution r of the radar $$\left(n = \left\lceil \frac{R_{max}}{r} \right\rceil\right);$$

and normalization processing is performed on maximum and minimum values of the grid data until the values are within a numerical range of 0-1, so as to generate normalized grid point radar echo data.

At the same time, color conversion is performed on the radar raw data by referring to Table 1, so as to generate an RGB color image for meteorological experts to label.

TABLE 1

| Level Range (dBZ) | Red (R) | Green (G) | Blue (B) |
| --- | --- | --- | --- |
| <−2.5 | 0 | 172 | 164 |
| −2.5~2.5 | 192 | 192 | 254 |
| 2.5~7.5 | 122 | 114 | 238 |
| 7.5~12.5 | 30 | 38 | 208 |
| 12.5~17.5 | 166 | 252 | 168 |
| 17.5~22.5 | 0 | 234 | 0 |
| 22.5~27.5 | 16 | 146 | 26 |
| 27.5~32.5 | 252 | 244 | 100 |
| 32.5~37.5 | 200 | 200 | 2 |
| 37.5~42.5 | 140 | 140 | 0 |
| 42.5~47.5 | 254 | 172 | 172 |
| 47.5~52.5 | 254 | 100 | 84 |
| 52.5~57.5 | 238 | 2 | 48 |
| 57.5~62.5 | 212 | 142 | 254 |
| >62.5 | 170 | 36 | 250 |

After gridding, normalization and processing, a total of 2216 images containing the features of the boundary layer convergence lines are generated.

S2: meteorological experts are invited to label the features of the boundary layer convergence lines for the RGB color image generated in S1. During labeling, a rotating box with five properties of center coordinate (x, y), width w, height h and inclination angle θ is designed as a data label. During the labeling by experts, an inclination direction of the rotating box needs to be kept perpendicular to a movement direction of the boundary layer convergence lines, and at the same time, the length and width of the rotating box need to just cover an affect region of the boundary layer convergence line; cross labeling is performed by at least 2 to 3 experts, and samples with great labeling difference are eliminated through comparison; the data label is mapped to the corresponding normalized grid point radar echo data to generate a boundary layer convergence line identification data set for model training. The labeled boundary layer convergence line includes the sea breeze front, the thunderstorm outflow boundary (arc-shaped gust front), the downburst outflow boundary, and also the horizontal convective roll.

Based on a screened label set, aspect ratios, areas and the like of all the bounding boxes in the label set are counted to describe information of scales of the boundary layer convergence lines, and an anchor window combination which can describe the image features of the boundary layer convergence lines of different scales observed by weather radars of different types and different bands is designed by using K-Mean clustering analysis method in combination with prior knowledge.

Figure 2:
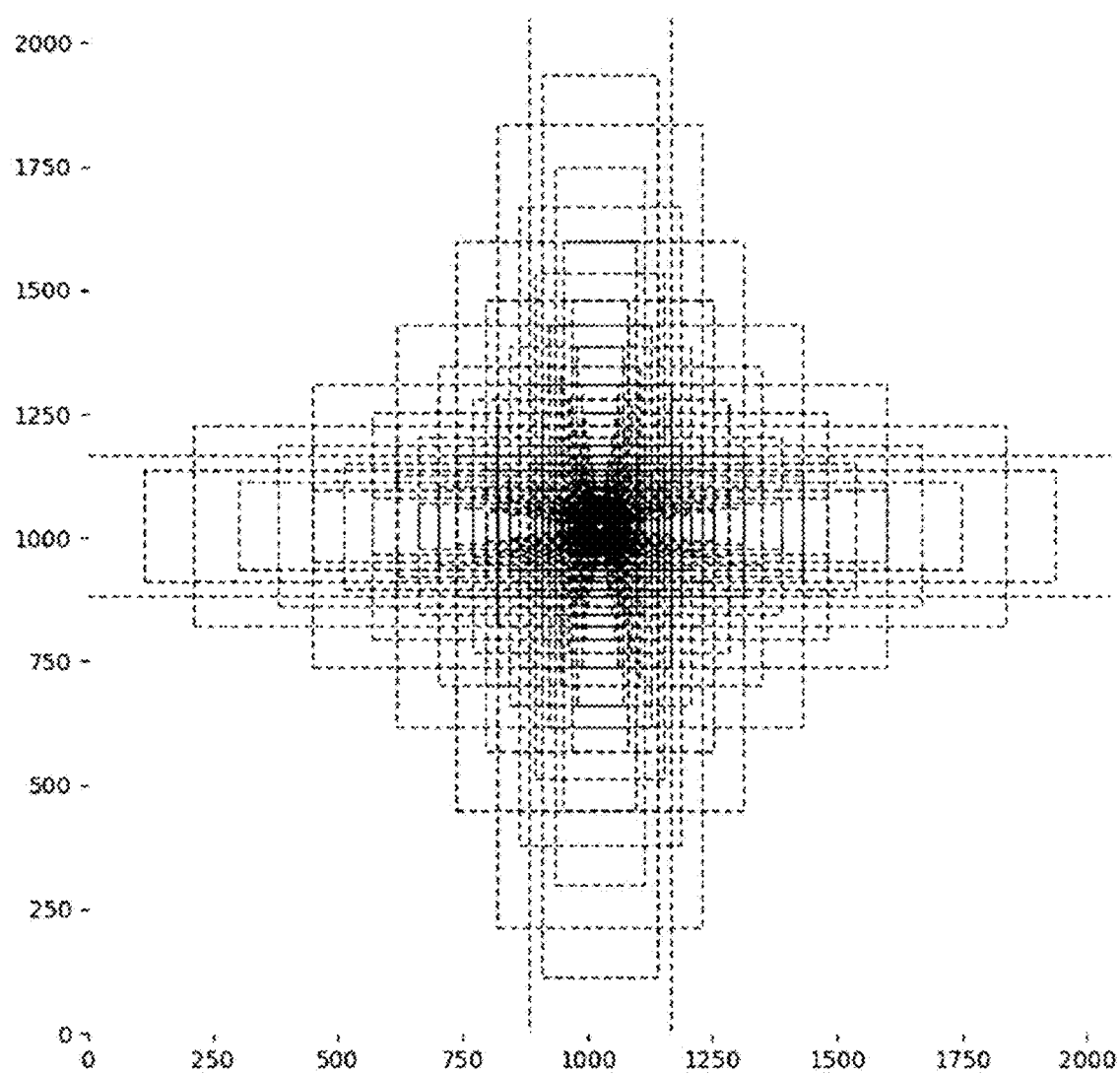
FIG. 2 is a schematic diagram of an anchor window combination designed by the present invention.
Figure 3:
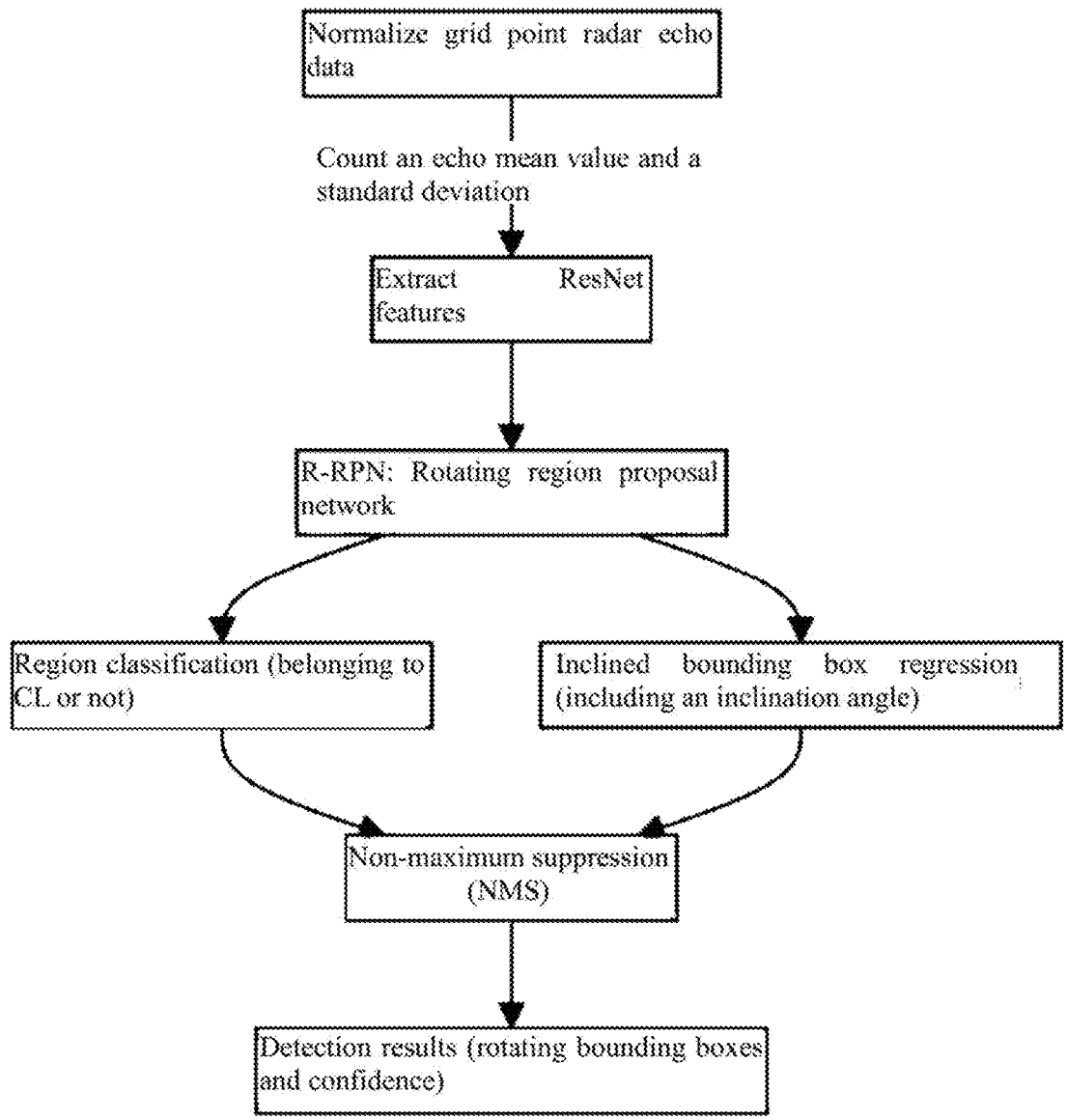
FIG. 3 is a structural block diagram of an R2CNN deep learning model provided by the present invention.

S3: an R2CNN model is constructed, and model parameters are designed according to image features of the boundary layer convergence lines to perform model training; in the constructed R2CNN deep learning model, predefined rotating anchor windows of a rotating region proposal network are configured as anchor windows with ratios of 0.125, 0.25, 0.5, 1, 2, 4 and 8 (as shown in FIG. 2), and these ratios are used for defining the aspect ratio of each anchor point; and this setting can adapt to the boundary layer convergence lines with different sizes and angles observed by the weather radars of different types and different bands, and can effectively improve the model detection performance. The overall structure of the deep learning model is shown in FIG. 3. After the images are put into the model, target predication is performed through a target prediction module, and a predicted feature map is sent to the rotating region proposal network; a region suggestion box is generated by the region proposal network; and the region suggestion box is subjected to pooling operation by using R-ROI Align to obtain features with a fixed size, and finally is sent to a detection network to obtain detection results of rotating bounding boxes.

S4: an image is detected by using the trained model to obtain detection results of rotating bounding boxes, a confidence score of the detection result of each rotating bounding box is calculated, and a predicted bounding box with a confidence less than a threshold is deleted; an overlapping extent of bounding boxes when the bounding boxes are overlapped is calculated; the two rotating bounding boxes with the overlapping extent meeting the requirements is determined as the detection result of the same boundary layer convergence line; and the other rotating bounding boxes are suppressed to obtain the rotating bounding boxes with high confidence scores as a final target detection result.

Figure 4:
FIG. 4 is a diagram showing a detection result of a rotating bounding box outputted by a model.

The overlapping extent is calculated by using intersection over union (IoU) for the detection results of the rotating bounding boxes which are overlapped during the detection of the same image. When the IoU is greater than or equal to 0.5, it is considered that regions detected by the two bounding boxes belong to the same boundary layer convergence line, and the rotating bounding box with a high confidence score is obtained as the final target detection result. Also, the overlapping extent is calculated by using the intersection over union (IoU) for the detection results of all the rotating bounding boxes in two images with different elevation angles at the same time; when the IoU is greater than or equal to 0.5, it is considered that regions detected by the two or more bounding boxes belong to the same boundary layer convergence line, and the rotating bounding box with a high confidence score is obtained as the final target detection result, as shown in FIG. 4.

Figure 5:
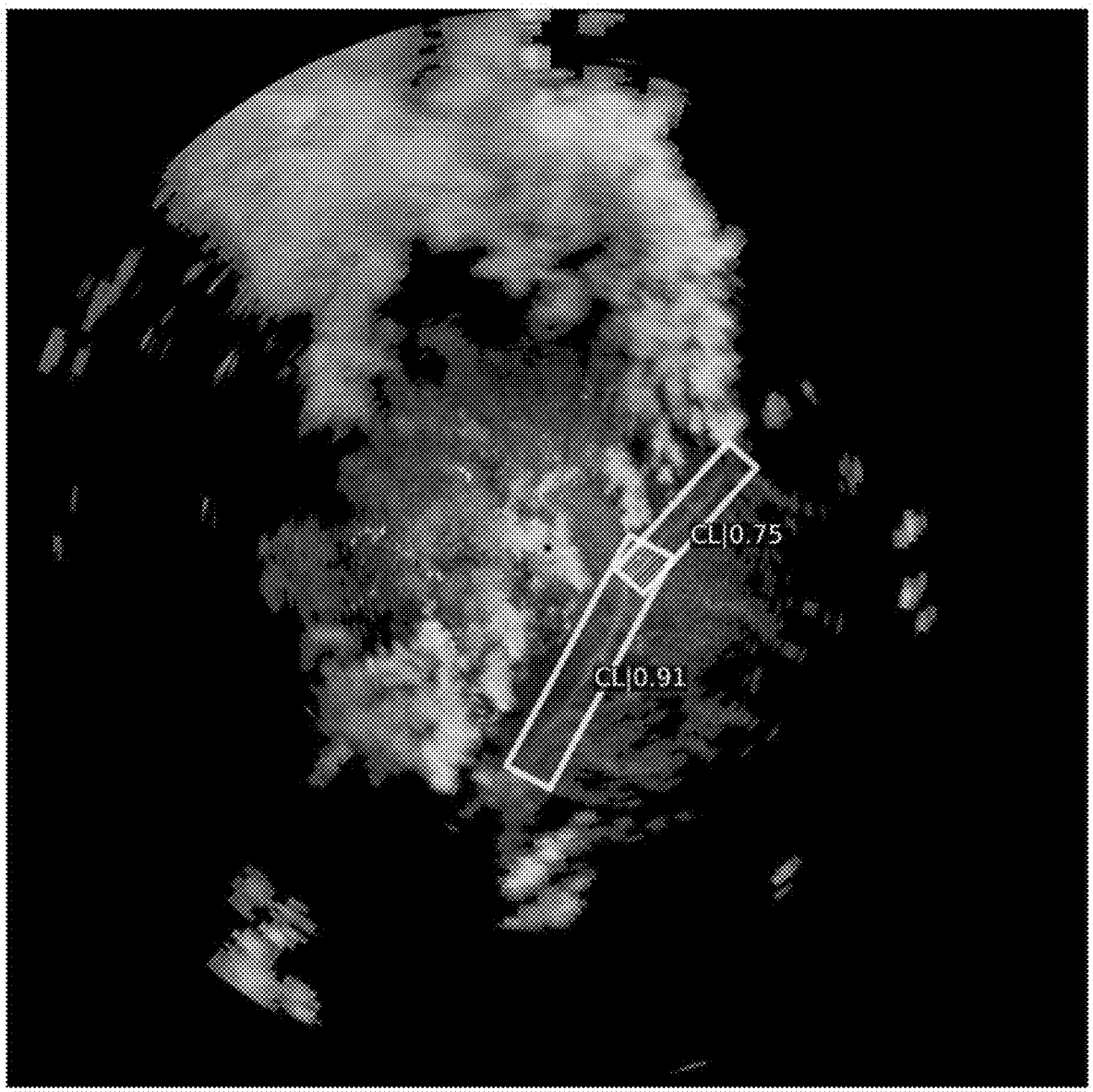
FIG. 5 is a diagram showing an identification result of a collision region of a plurality of boundary layer convergence lines.
Figure 6:
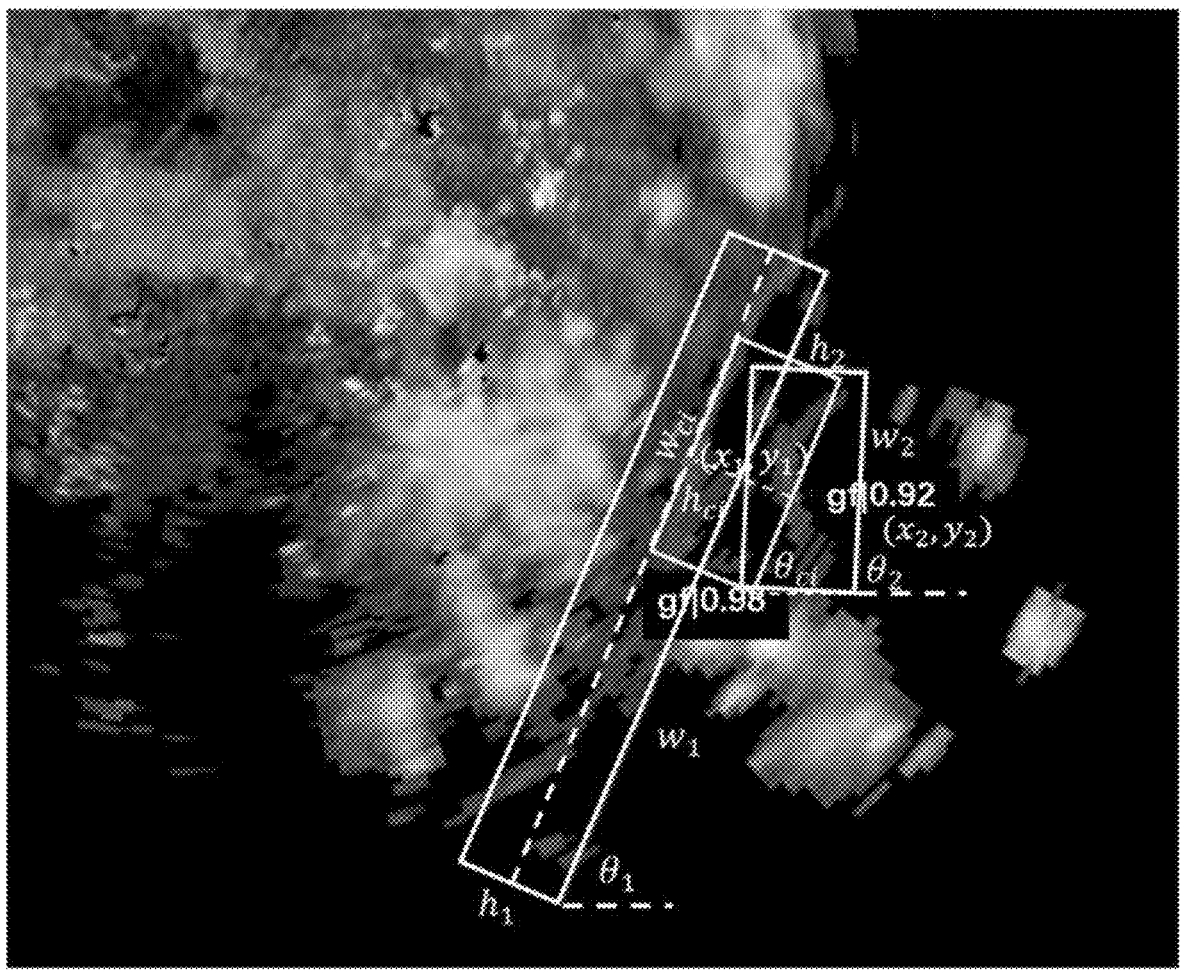
FIG. 6 is a diagram showing an identification result of a convection region easily triggered by a plurality of boundary layer convergence lines moving in opposite directions.

S5: when there are overlapped rotating bounding boxes, but the IoU is less than 0.3, it is considered that the two detected rotating bounding boxes are collision-type boundary layer convergence lines; an included angle between the two intersected bounding boxes is calculated; when the included angle is in a range of 30° to 90°, it is considered that an overlapped region is a region prone to trigger the local convection; an intersection region of the two bounding boxes is extracted as an identification result of a final region prone to trigger the local convection, as shown in FIG. 5; when the included angle is in a range of 0° to 30°, whether the movement directions of the two bounding boxes are opposite is judged; and if so, it is determined that an extension line of the center coordinate (x2, y2) of the narrower bounding box in the two bounding boxes is perpendicular to ½ of the height of the wider bounding box, the coordinate of this point is (x1, y1), the distance between the two coordinates is hci, the narrower width min (w1, w2) of the two bounding boxes is wci, and θci is max (θ1, θ2), which define final regions prone to trigger the local convection, as shown in FIG. 6.

A rotating boundary box without fixed value is designed in the present invention to manually label the boundary layer convergence lines with variable scales, extremely reducing the labeling workload of the experts. The present invention utilizes the K-Means clustering analysis method in combination with the prior knowledge to extract information such as aspect ratios and areas of all the bounding boxes in the label set. Based on this information, the anchor window combination which can describe the image features of the boundary layer convergence lines of different scales observed by the weather radars of different types and different bands is designed, which effectively improves the detection performance of the model on the boundary layer convergence lines. The present invention makes full use of the detection results of the rotating bounding boxes of R2CNN model to represent key feature parameters of the boundary layer convergence lines, including the length, width, central position and inclination angle of the boundary layer convergence lines in the radar image. Where, the length and width describe the size of the boundary layer convergence line region, the central position describes the position of the boundary layer convergence line in the radar image, and the inclination angle describes the direction of the boundary layer convergence line. The interaction features between the boundary layer convergence lines are described by using overlapping characteristics and mutual movement features of the bounding boxes, so as to achieve the goal of identifying the collision regions of the boundary layer convergence lines which are prone to trigger the local convection.

As mentioned above, although the present invention has been illustrated and described with reference to specific preferred examples, the examples should not be construed as limiting the present disclosure itself. Various changes can be made in the forms and details of the examples without departing from the spirit and scope of the present invention as defined by claims.

What is claimed is:

1. A method for identifying collision regions of boundary layer convergence lines prone to trigger local convection, comprising the following steps:

S1: processing radar raw data containing features of the boundary layer convergence lines to obtain normalized grid point radar echo data, and processing the obtained data into an RGB color image through color conversion;

S2: manually labeling and screening an image data set the RGB color image, designing a rotating box with five properties of center coordinate, width, height and angle of inclination as a data label, mapping the data label to the corresponding normalized grid point radar echo data to generate a boundary layer convergence line identification data set, and designing a multi-scale anchor box combination to the boundary layer convergence line identification data set by using a cluster analysis method:

S3: constructing en R2CNN a rotational region convolutional neural network (R2CNN) model, and designing model parameters according to image features of the boundary layer convergence lines to perform model training:

S4: detecting an image by using the trained model to obtain detection results of rotating bounding boxes, calculating a confidence score of the detection result of each rotating bounding box, and deleting a predicted bounding box with a confidence less than a threshold: calculating an overlapping extent of bounding boxes when the bounding boxes are overlapped: determining the two rotating bounding boxes with the overlapping extent meeting the requirements as the detection result of the same boundary layer convergence line: suppressing the other rotating bounding boxes to obtain the rotating bounding boxes with high confidence scores as a final target detection result:

S5: identifying pairwise intersected boundary layer convergence lines; when there are overlapped rotating bounding boxes, but the intersection over union is less than 0.3, considering that the two detected rotating bounding boxes are collision-type boundary layer convergence lines: calculating an included angle between the two intersected bounding boxes: when the included angle is in a range of 30° to 90°, considering that an overlapped region is a region prone to trigger the local convection: extracting an intersection region of the two bounding boxes as an identification result of a final region prone to trigger the local convection;

when the included angle is in a range of 0° to 30°, judging whether the movement directions of the two bounding boxes are opposite; and if so, determining central regions of the two bounding boxes as final regions prone to trigger the local convection.

2. The method for identifying collision regions of boundary layer convergence lines prone to trigger local convection according to claim 1, wherein the processing radar raw data containing features of the boundary layer convergence lines in step S1 comprises:

collecting radar raw data within continuous time, extracting radar reflectivity data of two lowest elevation angle layers from the data: according to a spatial resolution n of the processed radar data, adaptively processing the extracted data into uniform grid data of n×n km²; and performing normalization processing on maximum and minimum values of the grid data until the values are within a numerical range of 0 to 1, so as to generate normalized grid point radar echo data.

3. The method for identifying collision regions of boundary layer convergence lines prone to trigger local convection according to claim 1, wherein in step S2, the labeling of the features of the boundary layer convergence lines is performed on the RGB color image generated in S1; during labeling, the rotating box with five properties of center coordinate, width, height and the angle of inclination is designed as the data label, wherein the rotation direction of the rotating box keeps perpendicular to a movement direction of the boundary layer convergence lines and the length and width of the rotating box need to cover an affect region of the convergence lines.

4. The method for identifying collision regions of boundary layer convergence lines prone to trigger local convection according to claim 1, wherein in step S2, based on a screened label set, aspect ratios and areas of all the bounding boxes in the label set are counted to describe information of scales of the boundary layer convergence lines, and an anchor window combination which describes the image features of the boundary layer convergence lines of different scales observed by weather radars of different types and different bands is designed by using K-Means clustering analysis method in combination with prior knowledge.

5. The method for identifying collision regions of boundary layer convergence lines prone to trigger local convection according to claim 1, wherein in the R2CNN model constructed in step S3, predefined rotating anchor windows of a rotating region proposal network are configured as anchor windows with ratios of 0.125, 0.25, 0.5, 1, 2, 4 and 8, which are used for defining the aspect of each anchor point.

6. The method for identifying collision regions of boundary layer convergence lines prone to trigger local convection according to claim 1, wherein in step S4, predicted results of the rotating bounding boxes outputted by the R2CNN model are preliminarily screened, and a predicted confidence threshold is set to 0.5, and the predicted bounding box with confidence lower than the threshold is deleted: at the same time, according to the image features of the boundary layer convergence lines, the bounding box with the inclination angle parallel to a connecting line direction from its center coordinate to a radar station is deleted, and the inclination angle is an included angle between the short side of the bounding box and the perpendicular direction.

7. The method for identifying collision regions of boundary layer convergence lines prone to trigger local convection according to claim 1, wherein in step S4, the overlapping extent is calculated by using intersection over union (IoU) for the detection results of the rotating bounding boxes which are overlapped during the detection of the same image; when the IoU is greater than or equal to 0.5, it is considered that regions detected by the two or more bounding boxes belong to the same boundary layer convergence line, and the other rotating bounding boxes are suppressed to obtain the rotating bounding box with a high confidence score as the final target detection result: the overlapping extent is calculated by using the intersection over union (IoU) for the detection results of all the rotating bounding boxes in two images with different elevation angles at the same time: when the IoU is greater than or equal to 0.5, it is considered that regions detected by the two or more bounding boxes belong to the same boundary layer convergence line, and the other rotating bounding boxes are suppressed to obtain the rotating bounding box with a high confidence score as the final target detection result.

* * * * *